(12) United States Patent
Suzuki

(10) Patent No.: US 11,516,176 B2
(45) Date of Patent: Nov. 29, 2022

(54) NETWORK MANAGEMENT APPARATUS, NETWORK MANAGEMENT SYSTEM, AND NON-TRANSITORY COMPUTER-READABLE STORAGE MEDIUM

(71) Applicant: FUJITSU LIMITED, Kawasaki (JP)

(72) Inventor: Kazuhiro Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/158,044

(22) Filed: Jan. 26, 2021

(65) Prior Publication Data

US 2021/0281536 A1    Sep. 9, 2021

(30) Foreign Application Priority Data

Mar. 4, 2020  (JP) .............................. JP2020-036567

(51) Int. Cl.
| | |
|---|---|
| *H04L 29/12* | (2006.01) |
| *H04L 61/10* | (2022.01) |
| *H04L 49/20* | (2022.01) |
| *H04L 49/00* | (2022.01) |
| *H04L 67/1095* | (2022.01) |

(52) U.S. Cl.
CPC ............ *H04L 61/10* (2013.01); *H04L 49/208* (2013.01); *H04L 49/70* (2013.01); *H04L 67/1095* (2013.01)

(58) Field of Classification Search
CPC ....... H04L 49/208; H04L 49/70; H04L 61/10; H04L 41/20; H04L 45/586; H04L 67/1095

See application file for complete search history.

(56) References Cited

U.S. PATENT DOCUMENTS

| | | | |
|---|---|---|---|
| 2013/0054773 A1 | 2/2013 | Onoue | |
| 2017/0180250 A1* | 6/2017 | Shen | ..................... H04L 45/586 |
| 2018/0287942 A1 | 10/2018 | Xie et al. | |
| 2018/0349163 A1* | 12/2018 | Gao | ........................ H04L 49/208 |
| 2019/0123962 A1* | 4/2019 | Guo | ........................ H04L 41/20 |
| 2020/0053024 A1* | 2/2020 | Suzuki | ............... G06F 9/45533 |
| 2020/0213246 A1* | 7/2020 | Pan | ................... G06F 15/17331 |
| 2020/0382412 A1* | 12/2020 | Chandrappa | ............ H04L 12/18 |
| 2020/0401492 A1* | 12/2020 | Vijayvargiya | ...... G06F 9/45558 |
| 2020/0403937 A1* | 12/2020 | Suzuki | .................. H04L 49/354 |

FOREIGN PATENT DOCUMENTS

| | | |
|---|---|---|
| JP | 2013-51531 A | 3/2013 |
| JP | 2018-516520 A | 6/2018 |

* cited by examiner

*Primary Examiner* — Jungwon Chang
(74) *Attorney, Agent, or Firm* — Fujitsu Patent Center

(57) ABSTRACT

A network management apparatus includes a first controller, a memory, and a second controller. The first controller configured to operate a first virtual machine including a first container monitoring the mirror packet and a virtual switch transferring the mirror packet. The memory configured to store a destination information of the mirror packet and an address corresponding to the first container in association with each other. The second controller configured to cause the virtual switch to perform an operation to transmit the address corresponding to the first container from the virtual switch and cause the virtual machine to perform an operation to transfer the mirror packet to the first container from the first virtual machine, using the address corresponding to the first container when the virtual machine receives the mirror packet from the virtual switch and requests address resolution for the destination information of the mirror packet.

16 Claims, 18 Drawing Sheets

FIG. 6A

```
# ip route add from 10.0.0.1/32 table rule01 priority 100
```

FIG. 6B

```
# ip route add 10.0.3.1/32 dev cali5 table rule01
# ip route add default via 10.0.3.1 dev cali5 table rule01
```

FIG. 11

```
ROUTING TABLE
10.0.1.1/32 dev cali1
10.0.1.2/32 dev cali2
10.0.0.0/24 via 192.168.1.10 dev eth0
10.0.2.0/24 via 192.168.1.12 dev eth0
```

FIG. 12

| ID | TARGET CONTAINER IP ADDRESS | TARGET PORT | DIRECTION | MIRROR DESTINATION IP ADDRESS | MIRROR DESTINATION PORT |
|---|---|---|---|---|---|
| 1 | 10.0.0.1/32 | port1 | BIDIRECTIONAL | 10.0.1.2/32 | port2 |
| 2 | 10.0.3.1/32 | port3 | EGRESS | 10.0.1.2/32 | port2 |
| 3 | 10.0.4.1/32 | port4 | INGRESS | 10.0.5.1/32 | port5 |

FIG. 13

| ID | TARGET CONTAINER IP ADDRESS | DIRECTION | MIRROR DESTINATION MAC ADDRESS | ROUTER IP ADDRESS |
|---|---|---|---|---|
| 1 | 10.0.0.1/32 | BIDIRECTIONAL | AAA | None |
| 2 | 10.0.3.1/32 | EGRESS | AAA | None |
| 3 | 10.0.4.1/32 | INGRESS | BBB | None |

FIG. 14A

| ID | TARGET CONTAINER IP ADDRESS | DIRECTION | MIRROR DESTINATION MAC ADDRESS | ROUTER IP ADDRESS |
|---|---|---|---|---|
| 1 | 10.0.0.1/32 | BIDIRECTIONAL | AAA | 192.168.1.10 |

FIG. 14B

| ID | TARGET CONTAINER IP ADDRESS | DIRECTION | MIRROR DESTINATION MAC ADDRESS | ROUTER IP ADDRESS |
|---|---|---|---|---|
| 1 | 10.0.0.1/32 | BIDIRECTIONAL | AAA | 192.168.1.12 |

NETWORK MANAGEMENT APPARATUS, NETWORK MANAGEMENT SYSTEM, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2020-36567, filed on Mar. 4, 2020, the entire contents of which are incorporated herein by reference.

FIELD

The embodiments discussed herein are related to a network management system, a network management device, and a non-transitory computer-readable storage medium.

BACKGROUND

In server virtualization technology, a control program called hypervisor operates in a physical server, and a virtual server called virtual machine (VM) operates on the hypervisor. Port mirroring for the purpose of traffic monitoring is sometimes performed between VMs operating in the physical server.

FIG. 1 illustrates an example of port mirroring between VMs. A host device 101 is a physical server, and a VM 111 and a VM 112 are operating in the host device 101. A virtual switch 121 in the host device 101 includes a port1 and a port2 that are virtual ports. The VM 111 and the VM 112 include an eth0 that is a virtual network interface controller (NIC).

For example, in a case where the VM 112 monitors the traffic of the VM 111, an ingress packet 131 or an egress packet 132 passing through the port1 connected to the eth0 of the VM 111 is a mirror target. The ingress packet 131 is a packet received by the VM 111, and the egress packet 132 is a packet transmitted by the VM 111. The mirror target may be either the ingress packet 131 or the egress packet 132, or may be both the ingress packet 131 and the egress packet 132.

In the port mirroring, a mirror packet is generated by copying the mirror target packet passing through the port1, and the generated mirror packet is transferred to the VM 112 via the port2.

Meanwhile, in container-type virtualization technology, a control program called container engine operates in a physical server, and a virtual operating system (OS) space called container is provided on the container engine. The container contains an application and a library used by the application. A plurality of containers can be deployed in one VM and operate by combining the server virtualization technology and the container-type virtualization technology.

Calico is known as open source software that connects containers by internet protocol (IP) routing. Connection by IP routing is also called L3 connection.

FIG. 2 illustrates an example of containers connected by the L3 connection within the VM 111 in FIG. 1. A container 211 and a container 212 operate in the VM 111. The container 211 and the container 212 include eth0 as a virtual NIC.

The eth0 of the container 211 is connected to cali1, and the eth0 of the container 212 is connected to cali2. The cali1 and cali2 are virtual taps and are connected to the eth0 of the VM 111 via a virtual router 221. The eth0 and cali1 of the container 211 are virtual ethernet tunnel pair (veth-pair) ports. Similarly, the eth0 and cali2 of the container 212 are veth-pair ports.

An IP address of the container 211 is "10.0.01/32", and an IP address of the container 212 is "10.0.0.2/32". An IP address GW of a default gateway is "169.254.1.1". A media access control (MAC) address of the cali1 is "A", and a MAC address of the cali2 is "B".

The cali1 and cali2 have a proxy address resolution protocol (ARP) function. When the container 211 transmits an Arp request for the IP address GW of the default gateway to the cali1, the cali1 returns an Arp reply including the MAC address "A" of the cali1 to the container 211. When the container 212 transmits an Arp request for the IP address GW of the default gateway to the cali2, the cali2 returns an Arp reply including the MAC address "B" of the cali2 to the container 212.

In a routing table 201 of the virtual router 221, the cali1 is registered as an interface corresponding to the route to the IP address "10.0.0.1/32" of the container 211. Furthermore, the cali2 is registered as an interface corresponding to the route to the IP address "10.0.0.2/32" of the container 212.

FIG. 3 illustrates an example of a method of setting route information in the VM 112 in FIG. 1. A container 311 and a container 312 operate in the VM 112. The container 311 and the container 312 include eth0 as the virtual NIC.

The eth0 of the container 311 is connected to cali3, and the eth0 of the container 312 is connected to cali4, The cali3 and cali4 are virtual taps and are connected to the eth0 of the VM 112 via a virtual router 321. An IP address of the container 311 is "10.0.1.1/32", and an IP address of the container 312 is "10.0.1.2/32".

The eth0 of the VM 111 and the eth0 of the VM 112 are connected to a virtual communication network 302. An IP address of the eth0 of the VM 111 is "192.168.0.1", and an IP address of the eth0 of the VM 112 is "192.168.0.2".

In the VM 111, a border gateway protocol (BGP) daemon 222 operates, and in the VM 112, a BGP daemon 322 operates. The BGP daemon 222 and the BGP daemon 322 exchange the route information between the VMs via the virtual communication network 302. Then, the BGP daemon 222 sets the route information in the routing table 201 in FIG. 2, and the BGP daemon 322 sets the route information in a routing table 301 of the virtual router 321.

In the routing table 301 of the virtual router 321, the cali3 is registered as an interface corresponding to the route to the IP address "10.0.1.1/32" of the container 311. Furthermore, the cali4 is registered as an interface corresponding to the route to the IP address "10.0.1.2/32" of the container 312. Moreover, the IP address "192.168.0.1" of the eth0 of the VM 111 is registered as a next hop corresponding to the route to an IP address "10.0.0.0/24", and the eth0 of the VM 112 is registered as an interface.

In relation to ARP, a communication method capable of suppressing a load on a network and a method of transferring a data packet by an L3 virtual extended local area network gateway are known (see, for example, Japanese Laid-open Patent Publication No. 2013-51531 and Japanese National Publication of International Patent Application No. 2018-516520).

Japanese Laid-open Patent Publication No. 2013-51531 and Japanese National Publication of International Patent Application No 2018-516520 are disclosed as related art.

SUMMARY

According to an aspect of the embodiments, a network management apparatus includes: a first controller configured to operate a first virtual machine and a virtual switch, the first virtual machine including a first container monitoring the mirror packet, the virtual switch transferring the mirror packet; a memory configured to store a destination information of the mirror packet and an address corresponding to the first container in association with each other, and a second controller configured to cause the virtual switch to perform a first operation and cause the virtual machine to perform a second operation when the virtual machine receives the mirror packet from the virtual switch and requests address resolution for the destination information of the mirror packet. The first operation is an operation to transmit the address corresponding to the first container from the virtual switch, and The second operation is an operation to transfer the mirror packet to the first container from the first virtual machine, using the address corresponding to the first container.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6A is diagram illustrating a method of setting PBR;

FIG. 6B is diagram illustrating a method of setting PBR;

FIG. 11 is a diagram illustrating a routing table;

FIG. 12 is a diagram illustrating a management table;

FIG. 13 is a diagram illustrating a control table;

FIG. 14A is diagram illustrating entries in the control table;

FIG. 14B is diagram illustrating entries in the control table;

DESCRIPTION OF EMBODIMENTS

In the related art, In a case of performing port mirroring of traffic of a container, using a port mirroring function of a VM in an environment where the container is deployed in the VM, it is not easy to correctly transfer a mirror packet to the container that monitors the traffic.

In one aspect, the present embodiments aim to transfer a mirror packet to another container in monitoring traffic of a container deployed in a VM.

Hereinafter, embodiments will be described in detail with reference to the drawings.

Figure 1:
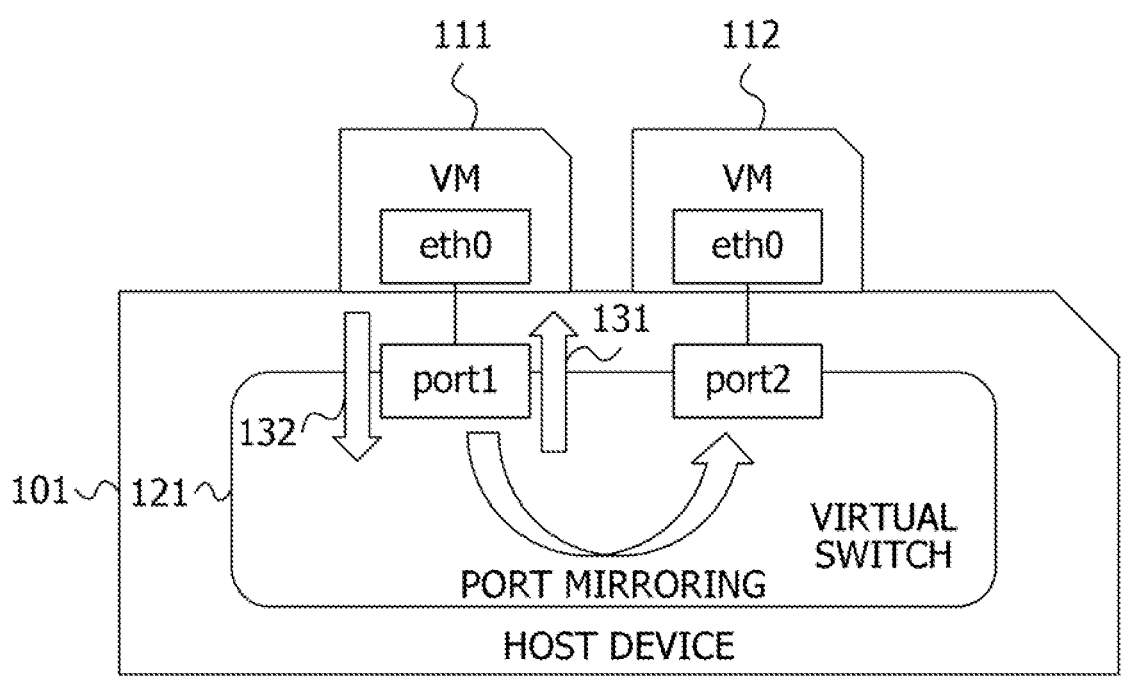
FIG. 1 is a diagram illustrating port mirroring.
Figure 2:
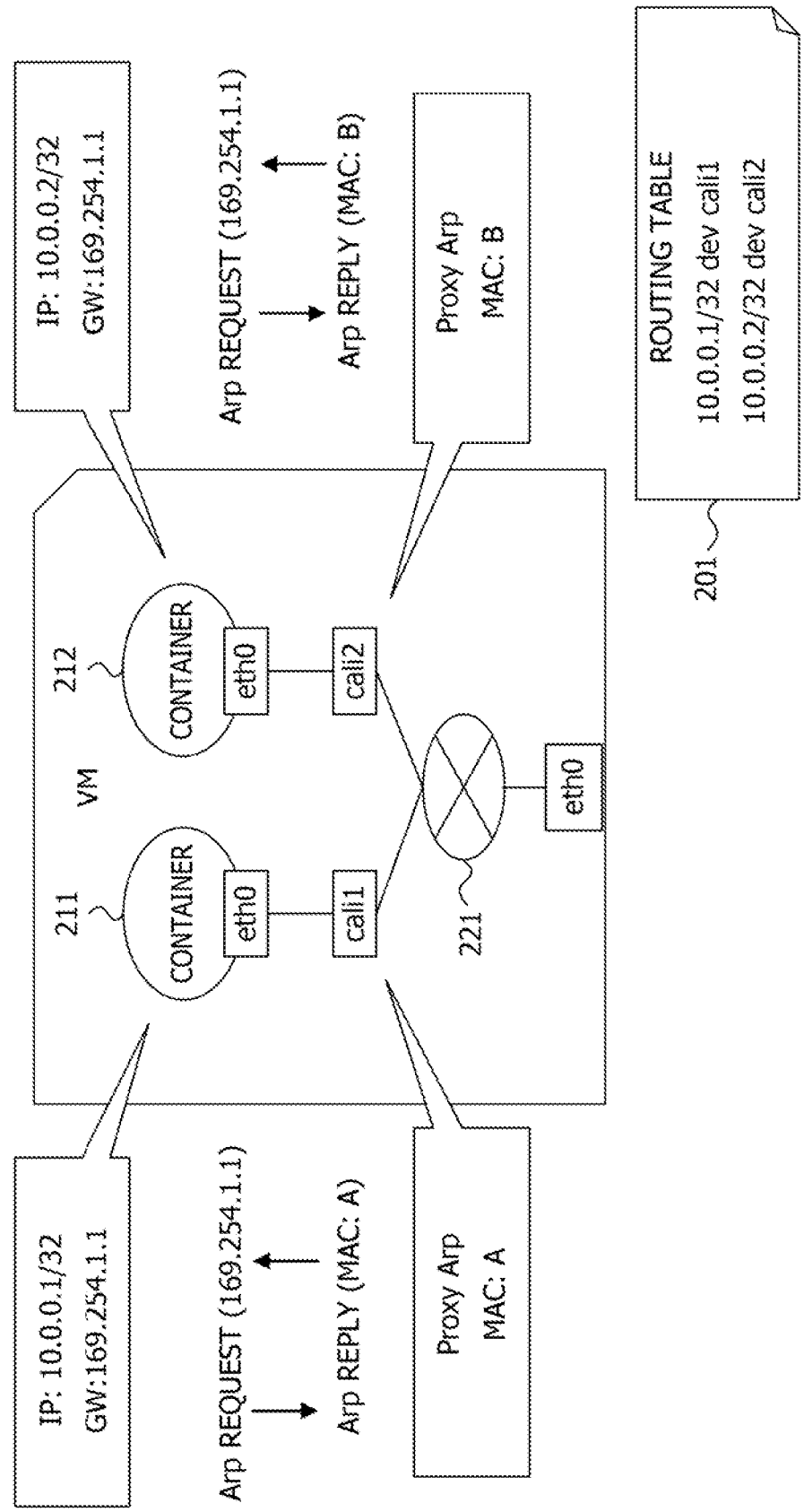
FIG. 2 is a diagram illustrating containers connected by L3 connection.
Figure 3:
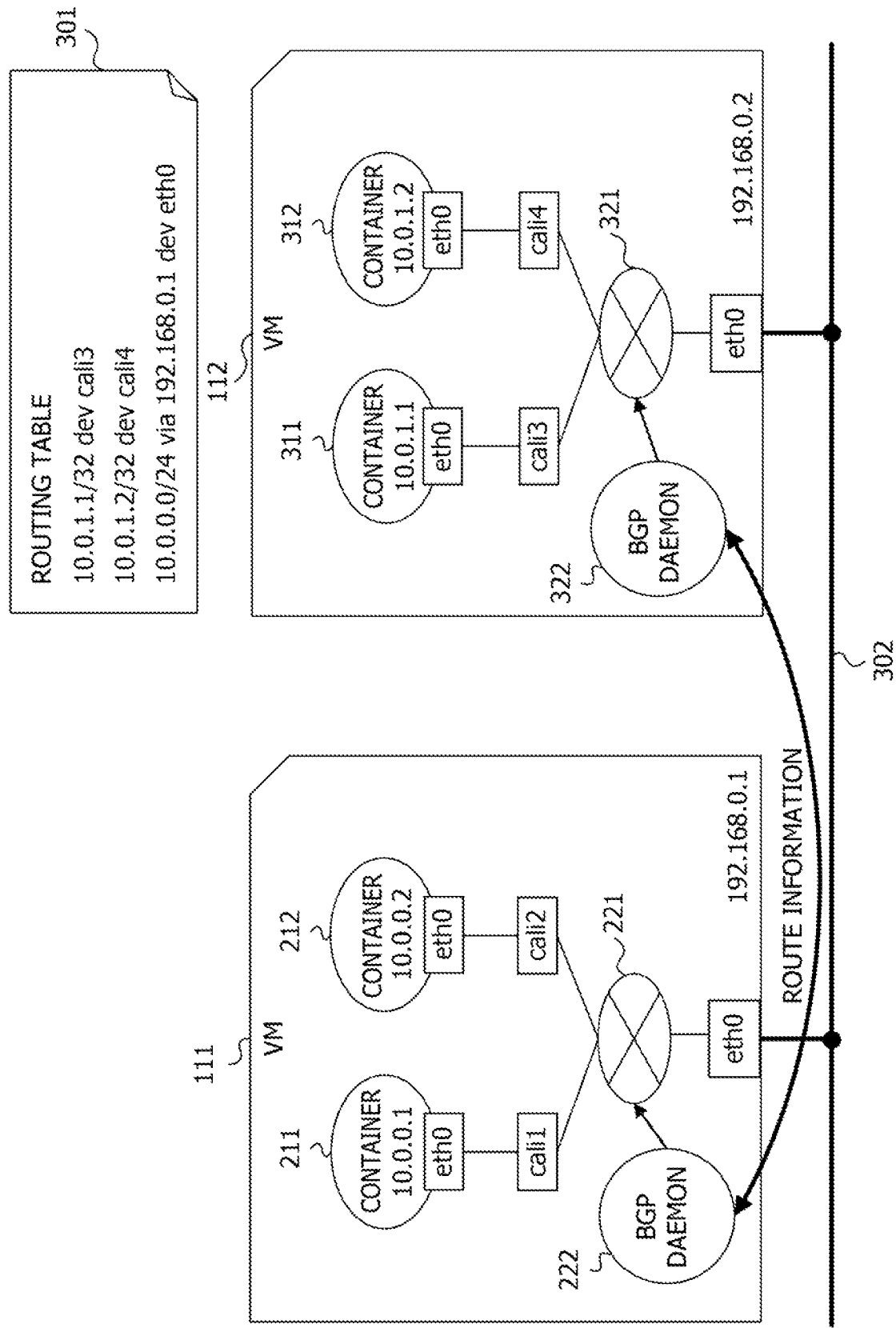
FIG. 3 is a diagram illustrating a method of setting route information.
Figure 4:
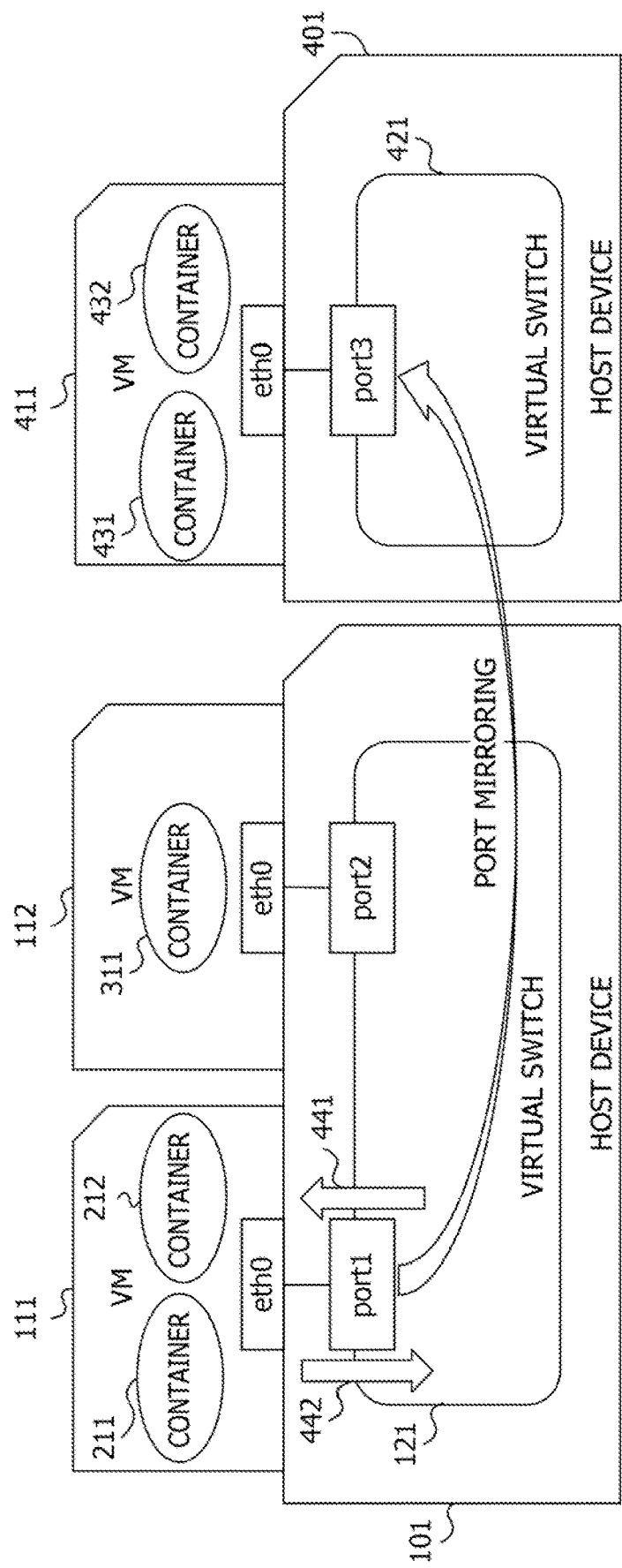
FIG. 4 is a diagram illustrating an information processing system.

FIG. 4 illustrates an example of an information processing system including a plurality of VMs including containers. The information processing system in FIG. 4 includes a host device 101 in FIG. 1 and a host device 401. A container 211 and a container 212 operate in a VM 111, and a container 311 operates in a VM 112.

The host device 401 is a physical server, and a VM 411 is operating in the host device 401. A container 431 and a container 432 operate in the VM 411. A virtual switch 421 in the host device 401 includes port3 that is a virtual port. The VM 411 includes eth0 that is a virtual NIC.

For example, in a case where the container 431 monitors the traffic of the container 211, an ingress packet 441 or an egress packet 442 passing through the port1 is a mirror target. The ingress packet 441 is a packet received by the container 211, and the egress packet 442 is a packet transmitted by the container 211.

In the port mirroring, a mirror packet is generated by copying the mirror target packet passing through the port1, and the generated mirror packet is transferred to the VM 411 via the port3 in the host device 401.

However, since a destination of the mirror packet of the ingress packet 441 is the container 211, the mirror packet is not transferred to the container 431. Furthermore, in a case where the destination of the egress packet 442 is the container 311, since the destination of the mirror packet of the egress packet 442 is also the container 311, the mirror packet is not transferred to the container 431.

Therefore, to transfer the mirror packet to the container 431, a method of setting static routing on the basis of a destination address of the mirror packet is conceivable.

Figure 5:
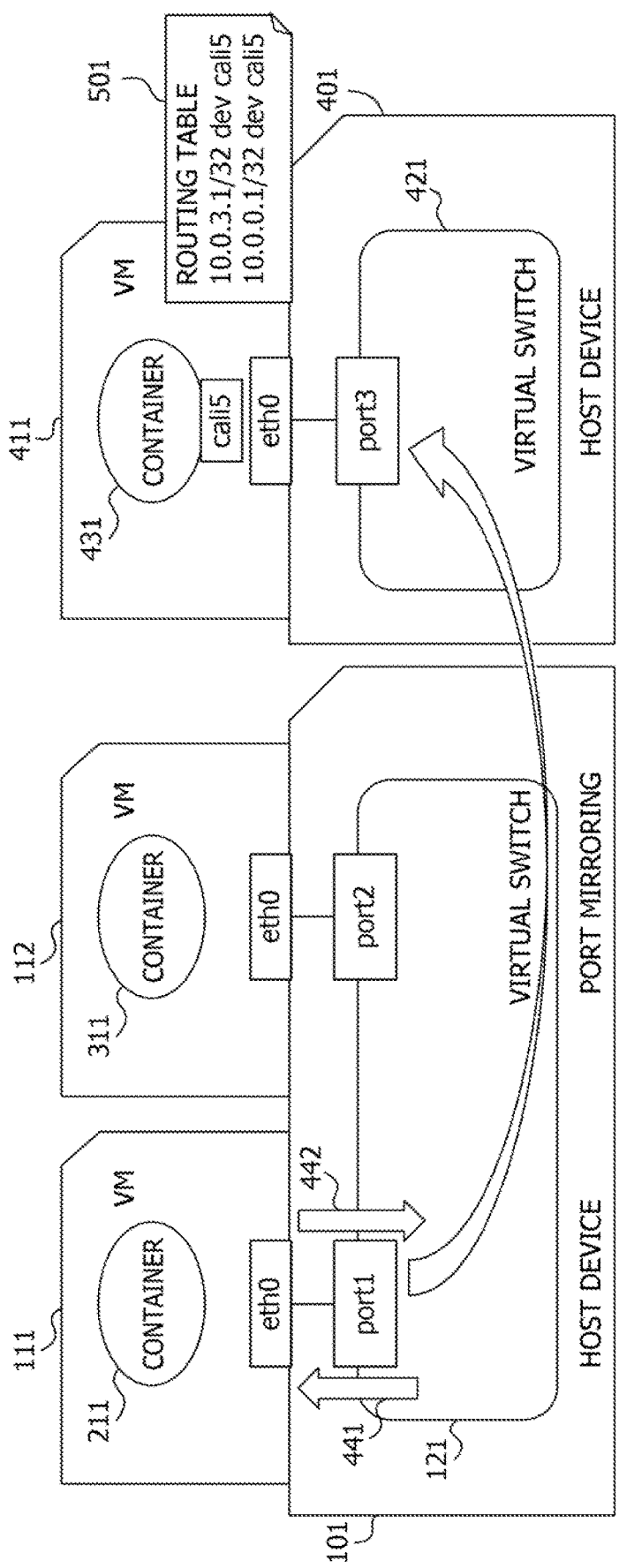
FIG. 5 is a diagram illustrating a method of setting static routing.

FIG. 5 illustrates an example of a method of setting static routing in the information processing system in FIG. 4. The container 431 is connected to cali5. In a routing table 501 of the VM 411, the cali5 is registered as an interface corresponding to the route to an IP address "10.0.3.1/32" of the container 431.

Since the destination of the mirror packet of the ingress packet 441 is the container 211, static routing can be added to the routing table 501, using an IP address "10.0.0.1/32" of the container 211. In this case, the cali5 is set as the interface corresponding to the route to the IP address "10.0.0.1/32" of the container 211. As a result, it becomes possible to transfer the mirror packet of the ingress packet 441 to the container 431 in the VM 411.

However, since the destination of the egress packet 442 is not uniquely determined, it is difficult to add, to the routing table 501, static routing for transferring the mirror packet of the egress packet 442 to the container 431.

Therefore, for the mirror packet of the egress packet 442, a method of setting routing using policy based routing (PBR) is conceivable. PBR is a function to set routing on the basis of conditions such as a transmission source address and an input interface.

FIGS. 6A and 6B illustrate examples of a method of setting PBR. FIG. 6A illustrates an example of PBR based on the transmission source address of the mirror packet of the egress packet 442. Since a transmission source of the egress packet 442 is the container 211, application of rule01 to a packet with the transmission source address that is the IP address "10.0.0.1/32" of the container 211 is defined.

FIG. 6B illustrates an example of routing based on the rule01. In the routing based on the rule01, the cali5 is set as the interface corresponding to the route to the IP address "10.0.3.1/32" of the container 431. Furthermore, as the IP address of the default gateway, the IP address "10.0.3.1/32" of the container 431 is set. As a result, it becomes possible to transfer the mirror packet of the egress packet 442 to the container 431 in the VM 411.

However, in the static routing in FIG. 5 or the PBR in FIGS. 6A and 6B, the routing table in the VM is changed. In a case where an owner of the VM is a user, it is not desirable that an administrator of the information processing system changes the routing table in the VM without permission of the user.

Figure 7:
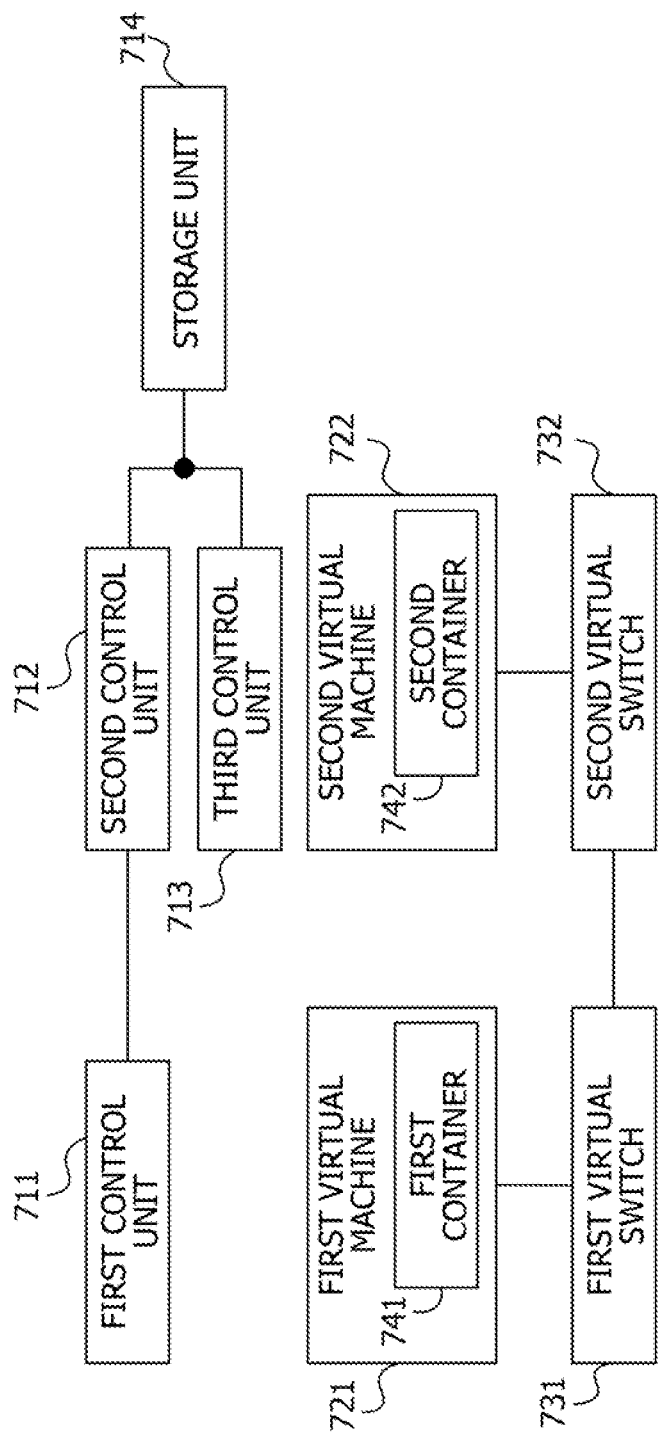
FIG. 7 is a functional configuration diagram of a network management system.

FIG. 7 illustrates a functional configuration example of a network management system according to the embodiment. A network management system 701 in FIG. 7 includes a first control unit 711, a second control unit 712, a third control unit 713, and a storage unit 714.

Figure 8:
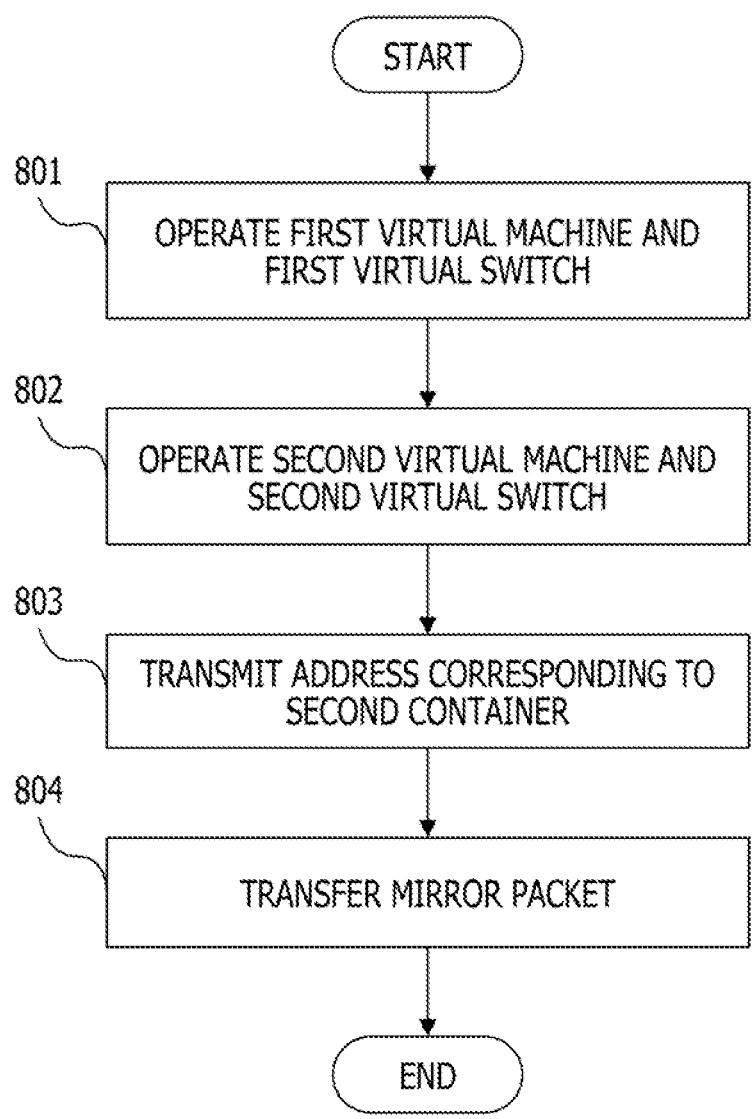
FIG. 8 is a flowchart of information processing.

FIG. 8 is a flowchart illustrating an example of information processing performed by the network management system 701 in FIG. 7. First, the first control unit 711 operates a first virtual machine 721 including a first container 741 and a first virtual switch 731 (step 801). The first virtual switch 731 transmits a mirror packet of a reception packet received by the first container 741 or a transmission packet transmitted by the first container 741.

Next, the second control unit 712 operates a second virtual machine 722 including a second container 742 that monitors the mirror packet and a second virtual switch 732 (step 802). The second virtual switch 732 receives the mirror packet from the first virtual switch 731 and transfers the mirror packet to the second virtual machine 722. The storage unit 714 stores destination information of the mirror packet in association with an address corresponding to the second container 742.

The second virtual machine 722 receives the mirror packet from the second virtual switch 732 and requests an address resolution for the destination information of the mirror packet. The third control unit 713 causes the second virtual switch 732 to perform an operation to transmit the address corresponding to the second container 742, the address being stored in association with the destination information of the mirror packet, to the second virtual machine 722 (step 803). Then, the third control unit 713 causes the second virtual machine 722 to perform an operation to transfer the mirror packet to the second container 742 using the address corresponding to the second container 742 (step 804).

According to the network management system 701 in FIG. 7, the mirror packet can be transferred to another container in monitoring the traffic of the container deployed in the VM.

Note that the first control unit 711 can also directly connect the virtual machine 721 and the second virtual switch 732, and cause the second virtual switch 732 to generate the mirror packet. In this case, the first control unit 711 omits the processing of operating the first virtual switch 731, and the second virtual switch 732 transfers the generated mirror packet to the second virtual machine 722.

Figure 9:
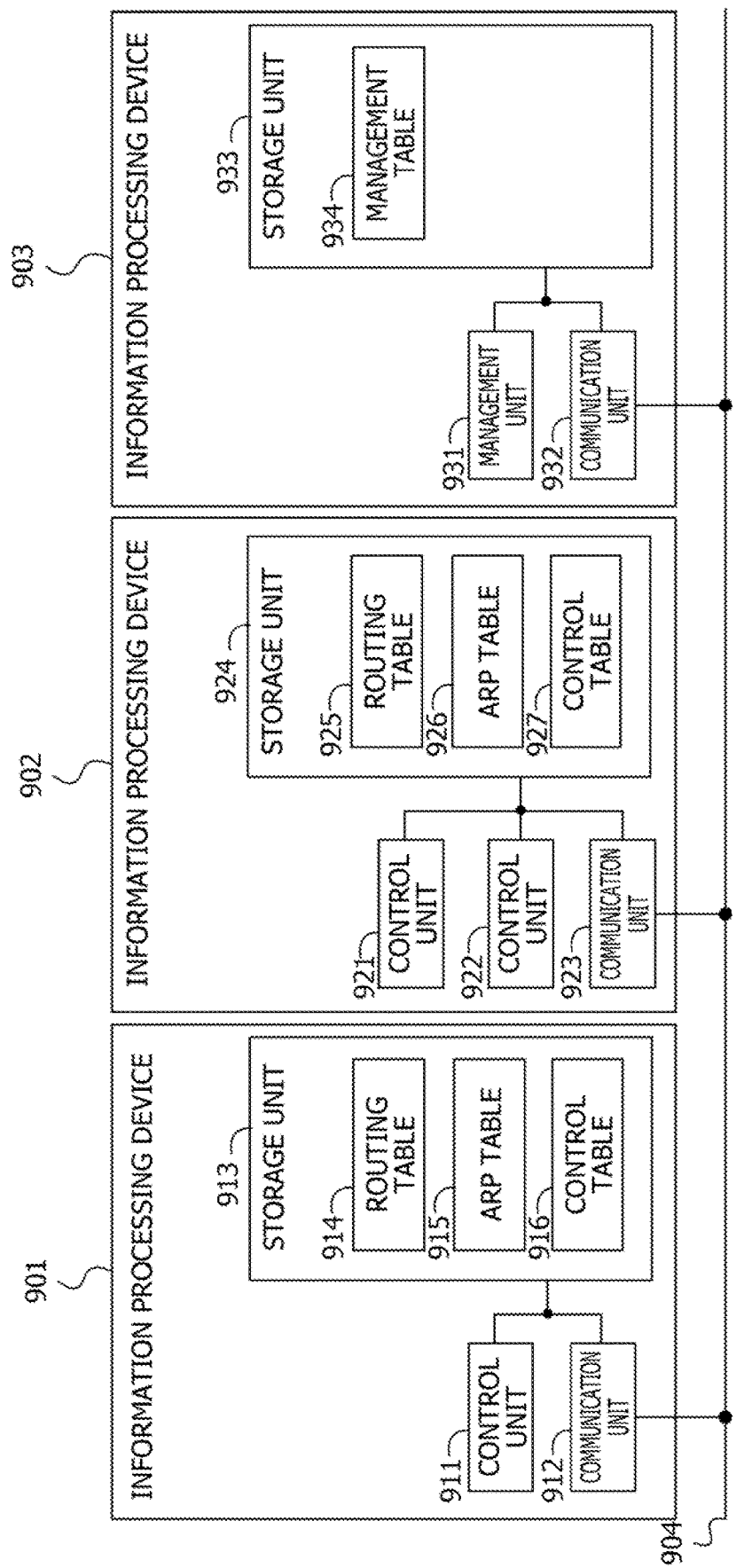
FIG. 9 is a functional configuration diagram of an information processing system.

FIG. 9 illustrates a functional configuration example of an information processing system corresponding to the network management system 701 in FIG. 7. The information processing system in FIG. 9 includes an information processing device 901 to an information processing device 903. The information processing device 901 to the information processing device 903 are connected to each other by a communication network 904. Examples of the communication network 904 include a local area network (LAN) or a wide area network (WAN).

The information processing device 901 includes a control unit 911, a communication unit 912, and a storage unit 913. The control unit 911 corresponds to the first control unit 711 in FIG. 7. The storage unit 913 stores a routing table 914, an ARP table 915, and a control table 916.

The routing table 914 stores route information between VMs operating in the information processing system. The ARP table 915 is an example of an address resolution table, and stores the IP address in association with the MAC address. The control table 916 stores the destination information of the mirror packet in association with the MAC address corresponding to the container that monitors the mirror packet.

The information processing device 902 is an example of a network management device, and includes a control unit 921, a control unit 922, a communication unit 923, and a storage unit 924. The control unit 921, the control unit 922, and the storage unit 924 correspond to the second control unit 712, the third control unit 713, and the storage unit 714 in FIG. 7, respectively. The storage unit 924 stores a routing table 925, an ARP table 926, and a control table 927.

The routing table 925 stores route information between VMs operating in the information processing system. The ARP table 926 stores the IP address in association with the MAC address. The control table 927 stores the destination information of the mirror packet in association with the MAC address corresponding to the container that monitors the mirror packet.

The information processing device 903 is used by the administrator of the information processing system and includes a management unit 931, a communication unit 932, and a storage unit 933. The storage unit 933 stores a management table 934. The management table 934 stores information for managing port mirroring in the information processing system. The management unit 931 manages the VMs and containers operating in the information processing system, and sets information in the management table 934 according to an instruction from the administrator.

The communication unit 912, the communication unit 923, and the communication unit 932 can communicate with each other via the communication network 904.

Figure 10:
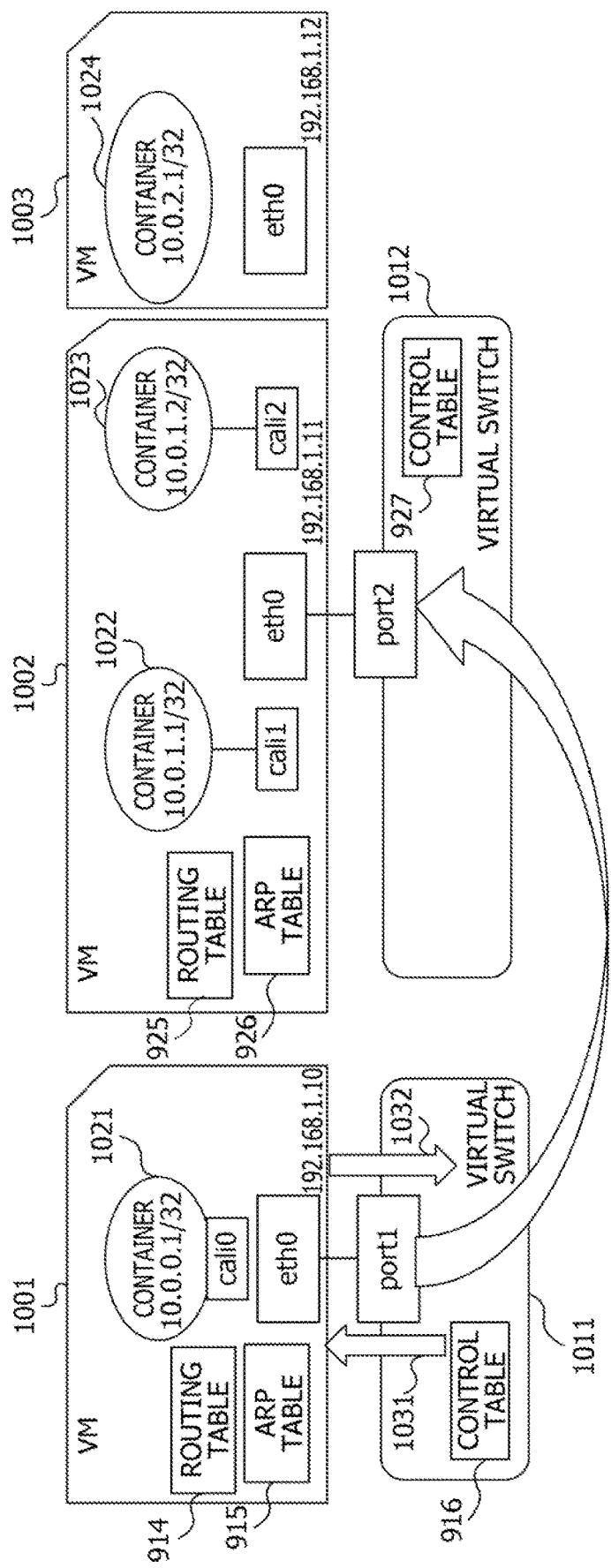
FIG. 10 is a diagram illustrating a VM system.

FIG. 10 illustrates an example of a VM system implemented by the information processing system in FIG. 9. A VM 1001 and a virtual switch 1011 operate in the information processing device 901, and a VM 1002, a VM 1003, and a virtual switch 1012 operate in the information processing device 902. In the VM 1001, a container 1021 operates. In the VM 1002, a container 1022 and a container 1023 operate. In the VM 1003, a container 1024 operates.

The VM 1001 includes cali0 and eth0, and the virtual switch 1011 includes port1. The VM 1002 includes cali1, cali2, and eth0, the VM 1003 includes eth0, and the virtual switch 1012 includes port2. cali0, cali1, and cali2 are virtual taps. eth0 is a virtual NIC. port1 and port2 are virtual ports.

The containers 1021 to 1024 are connected by L3 connection. The IP address of the container 1021 is "10.0.0.1/32". The IP address of the container 1022 is "10.0.1.1/32", and the IP address of the container 1023 is "10.0.1.2/32". The IP address of the container 1024 is "10.0.2.1/32".

The IP address of the eth0 of the VM 1001 is "192.168.1.10", the IP address of the eth0 of the VM 1002 is "192.168.1.11", and the IP address of the eth0 of the VM 1003 is "192.168.1.12".

The control unit 911 operates the VM 1001 and the virtual switch 1011, and the control unit 921 operates the VM 1002, the VM 1003, and the virtual switch 1012. The virtual switch 1011 and the virtual switch 1012 can communicate with each other via the communication unit 912 and the communication unit 923.

Note that the information processing system in FIG. 9 may include other information processing devices (not illustrated). Furthermore, the VIM system in FIG. 10 may include other VMs, containers, or virtual switches (not illustrated). Information of the control table that stores the destination information of the mirror packet in association with the MAC address corresponding to the container that monitors the mirror packet is shared by all the VMs in the information processing system. Therefore, the content of the control table 927 is the same as the content of the control table 916.

FIG. 11 illustrates an example of the routing table 925 stored in the information processing device 902. In the routing table 925 in FIG. 11, the cali1 is registered as an interface corresponding to the route to the IP address "10.0.1.1/32" of the container 1022. Furthermore, the cali2 is registered as an interface corresponding to the route to the IP address "10.0.1.2/32" of the container 1023.

Next, the IP address "192.168.1.10" of the eth0 of the VM 1001 is registered as a next hop corresponding to the route to the IP address "10.0.0.0/24", and the eth0 of the VM 1002 is registered as an interface. Furthermore, the IP address "192.168.1.12" of the eth0 of the VM 1003 is registered as a next hop corresponding to the route to an IP address "10.0.2.0/24", and the eth0 of the VM 1002 is registered as an interface.

FIG. 12 illustrates an example of the management table 934 stored in the information processing device 903. The management table 934 in FIG. 12 includes an ID, a target container IP address, a target port, a direction, a mirror destination IP address, and a mirror destination port.

The ID is identification information of an entry in the management table 934. The target container IP address is the IP address of the container to be monitored, and the target port represents a port through which the mirror target packet passes.

The direction represents a direction in which the mirror target packet passes through the target port. In a case where the direction is bidirectional, both the ingress and egress packets are the mirror targets. In a case where the direction is egress, only the egress packet is the mirror target, and in a case where the direction is ingress, only the ingress packet is the mirror target.

The mirror destination IP address is the IP address of the container that monitors the mirror packet, and the mirror destination port represents a port through which the mirror packet is transferred to the VM that includes the container. For example, in a case of an entry with ID "1", the container to be monitored is the container 1021, and the container for monitoring the mirror packet is the container 1023. In this case, the target container IP address is "10.0.0.1/32", the target port is the port1, the direction is bidirectional, the mirror destination IP address is "1.0.0.1.2/32", and the mirror destination port is the port2.

FIG. 13 illustrates an example of the control table 927 stored in the information processing device 902. The control table 927 in FIG. 13 includes an ID, a target container IP address, a direction, a mirror destination MAC address, and a router IP address. The ID is identification information of an entry in the control table 927.

The management unit 931 of the information processing device 903 transmits information of the management table 934 to the information processing device 902. The control unit 921 causes the virtual switch 1012 to perform an operation to generate the control table 927 based on the received information of the management table 934. The virtual switch 1012 stores the generated control table 927 in the storage unit 924.

The entries with ID "1" to ID "3" in FIG. 13 correspond to the entries with ID "1" to ID "3" in FIG. 12, respectively. Therefore, the target container IP address and direction of each entry in FIG. 13 are the same as the target container IP address and direction of the corresponding entry in FIG. 12.

The mirror destination MAC address is an example of the MAC address corresponding to the container, and is the MAC address of the interface corresponding to the route to the container that monitors the mirror packet. Therefore, a mirror destination MAC address "AAA" of the entries with ID "1" and ID "2" is the MAC address of the cali2 corresponding to the route to the container 1023.

The virtual switch 1012 can acquire the mirror destination MAC address by broadcasting the Arp request for the mirror destination IP address.

In the case where the virtual switch 1012 broadcasts the Arp request for the IP address of the container 1023, the cali2 returns the Arp reply including the MAC address "AAA" of the cali2 to the virtual switch 1012. Then, the virtual switch 1012 stores the MAC address "AAA" of the cali2 included in the Arp reply in the control table 927 as the mirror destination MAC address of the entries with ID "1" and ID "2".

The virtual switch 1012 can also acquire the mirror destination MAC address by observing the egress packet transmitted from the container that monitors the mirror packet.

The router IP address is an example of the destination information of the mirror packet, and represents the IP address of the VM including the container corresponding to the destination address of the mirror packet. An initial value "None" is stored as the router IP address at the time of generating the control table 927.

In the case where the port mirroring is performed based on the entry with ID "1" in FIG. 12, both an ingress packet 1031 and an egress packet 1032 passing through the port1 are the mirror targets. The ingress packet 1031 is a packet received by the container 1021, and the egress packet 1032 is a packet transmitted by the container 1021.

In this case, the virtual switch 1011 generates the mirror packet by copying each of the ingress packet 1031 and the egress packet 1032, and transmits the generated mirror packet to the virtual switch 1012. As a result, the mirror packet is transferred to the port2 connected to the VM 1002 in which the container 1023 is operating. The virtual switch 1012 transfers the mirror packet received from the virtual switch 1011 through the port2 to the VM 1002.

At this time, the control unit 921 causes the virtual switch 1012 to perform an operation to store the router IP address corresponding to the destination address of the mirror packet in the control table 927. First, the virtual switch 1012 searches the control table 927 for an entry satisfying the following conditions by using the transmission source address and the destination address of the received mirror packet.

Condition C1: The direction is ingress or bidirectional, and the target container IP address matches the destination address of the mirror packet.

Condition C2: The direction is egress or bidirectional, and the target container IP address matches the transmission source address of the mirror packet.

In a case where there is an entry that satisfies the condition C1 or condition C2, the virtual switch 1012 inquires of the BGP daemon in the VM 1002 the router IP address corresponding to the destination address of the received mirror packet. The BGP daemon acquires the router IP address from the routing table 925 and returns the router IP address to the virtual switch 1012.

The virtual switch 1012 stores the router IP address received from the BGP daemon as the router IP address of the searched entry. Thereby, the router IP address and the mirror destination MAC address are associated with each other in the control table 927.

FIGS. 14A and 14B illustrate examples of entries in which the router IP address and the mirror destination MAC address are associated with each other in the control table 927. FIG. 14A illustrates an example of an entry that satisfies the condition C1, and FIG. 14B illustrates an example of an entry that satisfies the condition C2.

In the case where the received mirror packet is the mirror packet of the ingress packet 1031, the destination address of the mirror packet is the IP address "10.0.0.1/32" of the container 1021. Therefore, the entry with ID "1" in FIG. 13 satisfies the condition C1.

In the routing table 925 in FIG. 11, the next hop corresponding to the route to the IP address "10.0.0.0/24" is "192.168.1.10". Therefore, "192.168.1.10" is acquired as the router IP address corresponding to the destination address "10.0.0.1/32" of the mirror packet, and is registered as the router IP address of the entry with ID "1" in FIG. 13.

Thereby, as illustrated in FIG. 14A, the IP address "192.168.1.10" of the eth0 of the VM 1001 and the MAC address "AAA" of the cali2 can be associated with each other.

Meanwhile, in the case where the received mirror packet is the mirror packet of the egress packet 1032, the transmission source address of the mirror packet is the IP address "10.0.0.1/32" of the container 1021. Therefore, the entry with ID "1" in FIG. 13 satisfies the condition C2.

In the case where the destination address of the egress packet 1032 is the IP address "10.02.1/32" of the container 1024, the destination address of the mirror packet is also "10.0.2.1/32". In the routing table 925 in FIG. 11, the next hop corresponding to the route to the IP address "10.0.2.0/24" is "192.168.1.12". Therefore, "192.168.1.12" is acquired as the router IP address corresponding to the destination address "10.0.2.1/32" of the mirror packet, and is registered as the router IP address of the entry with ID "1" in FIG. 13.

Thereby, as illustrated in FIG. 14B, the IP address "192.168.1.12" of the eth0 of the VM 1003 and the MAC address "AAA" of the cali2 can be associated with each other.

By using the IP address of the VM including the container corresponding to the destination address of the mirror packet as the destination information of the mirror packet, the IP address of the VM can be associated with the mirror destination MAC address in the control table 927. Therefore, it becomes possible to search for the MAC address of the interface corresponding to the route to the container that monitors the mirror packet, using the IP address of the VM.

Furthermore, it becomes possible to respond to the Arp request for the router IP address by registering the router IP address in association with the mirror destination MAC address in the control table 927 at the time when the virtual switch 1012 receives the mirror packet.

When the eth0 of the VM 1002 receives the mirror packet from the virtual switch 1012, the control unit 922 acquires the router IP address corresponding to the destination address of the mirror packet and causes the VM 1002 to perform an operation to request address resolution for the router IP address. First, the VM 1002 searches the routing table 925 to acquire the router IP address corresponding to the destination address of the received mirror packet. Then, the VM 1002 broadcasts an Arp request for the acquired router IP address.

Next, the control unit 922 causes the virtual switch 1012 to perform an operation to transmit the mirror destination MAC address associated with the router IP address included in the Arp request to the VM 1002 in the control table 927. In this case, the virtual switch 1012 responds to the Arp request.

In the case where the received mirror packet is the mirror packet of the ingress packet 1031, the destination address of the mirror packet is the IP address "10.0.0.1/32" of the container 1021. Therefore, the VM 1002 acquires "192.168.1.10" as the router IP address corresponding to the destination address "10.0.0.1/32" of the mirror packet from the routing table 925 in FIG. 11. Then, the VM 1002 broadcasts the Arp request for the router IP address "192.168.1.10".

When the virtual switch 1012 receives the Arp request, the virtual switch 1012 searches the control table 927 and acquires the mirror destination MAC address from the entry having the router IP address included in the Arp request. In this case, the virtual switch 1012 acquires the mirror destination MAC address "AAA" associated with the router IP address "192.168.1.10" from the entry in FIG. 14A. Then, the virtual switch 1012 returns the Arp reply including the mirror destination MAC address "AAA" to the VM 1002.

Meanwhile, in the case where the received mirror packet is the mirror packet of the egress packet 1032, and the destination of the egress packet 1032 is the container 1024, the destination address of the mirror packet is the IP address "10.0.2.1/32" of the container 1024. Therefore, the VM 1002 acquires "192.168.1.12" as the router IP address corresponding to the destination address "10.0.2.1/32" of the mirror packet from the routing table 925 in FIG. 11. Then, the VM 1002 broadcasts the Arp request for the router IP address "192.168.1.12".

When the virtual switch 1012 receives the Arp request, the virtual switch 1012 searches the control table 927. In this case, the virtual switch 1012 acquires the mirror destination MAC address "AAA" associated with the router IP address "192.168.1.12" from the entry in FIG. 14B. Then, the virtual switch 1012 returns the Arp reply including the mirror destination MAC address "AAA" to the VM 1002.

After returning the Arp reply to the VM 1002, the virtual switch 1012 changes the router IP address of the searched entry to the initial value "None" in the control table 927.

When the VM 1002 receives the Arp reply, the control unit 922 causes the VM 1002 to perform an operation to associate the destination address of the mirror packet with the mirror destination MAC address included in the Arp reply and storing the associated addresses in the ARP table 926. Thereby, in a case where a mirror packet having the same destination address is received next time, the mirror packet can be transferred to the container that monitors the mirror packet by using the mirror destination MAC address in the ARP table 926.

Next, the control unit 922 causes the VM 1002 to perform an operation to transfer the mirror packet to the container that monitors the mirror packet by using the mirror destination MAC address included in the Arp reply. The VM 1002 inserts the mirror destination MAC address "AAA" into a destination MAC field of the mirror packet and transmits the mirror packet. Thereby, the mirror packet is routed to the cali2 and reaches the container 1023.

Note that the container 1023 can also monitor the traffic of another container operating in the information processing device 902 instead of the container 1021 operating in the information processing device 901. In this case, the virtual switch 1012 generates the mirror packet and transfers the generated mirror packet through the port2 to the VM 1002 instead of the virtual switch 1011.

According to the information processing system in FIG. 9, in the environment in which the containers in the VMs are connected by L3 connection, the destination information of the mirror packet is registered in association with the mirror destination MAC address in the control table of the information processing device including the container that monitors the traffic Thereby, the information processing device can return the mirror destination MAC address as the Arp reply to the Arp request for the destination information of the mirror packet. Therefore, the mirror packet can be correctly transferred to the container that monitors the traffic, using the port mirroring function of the VM.

Figure 15:
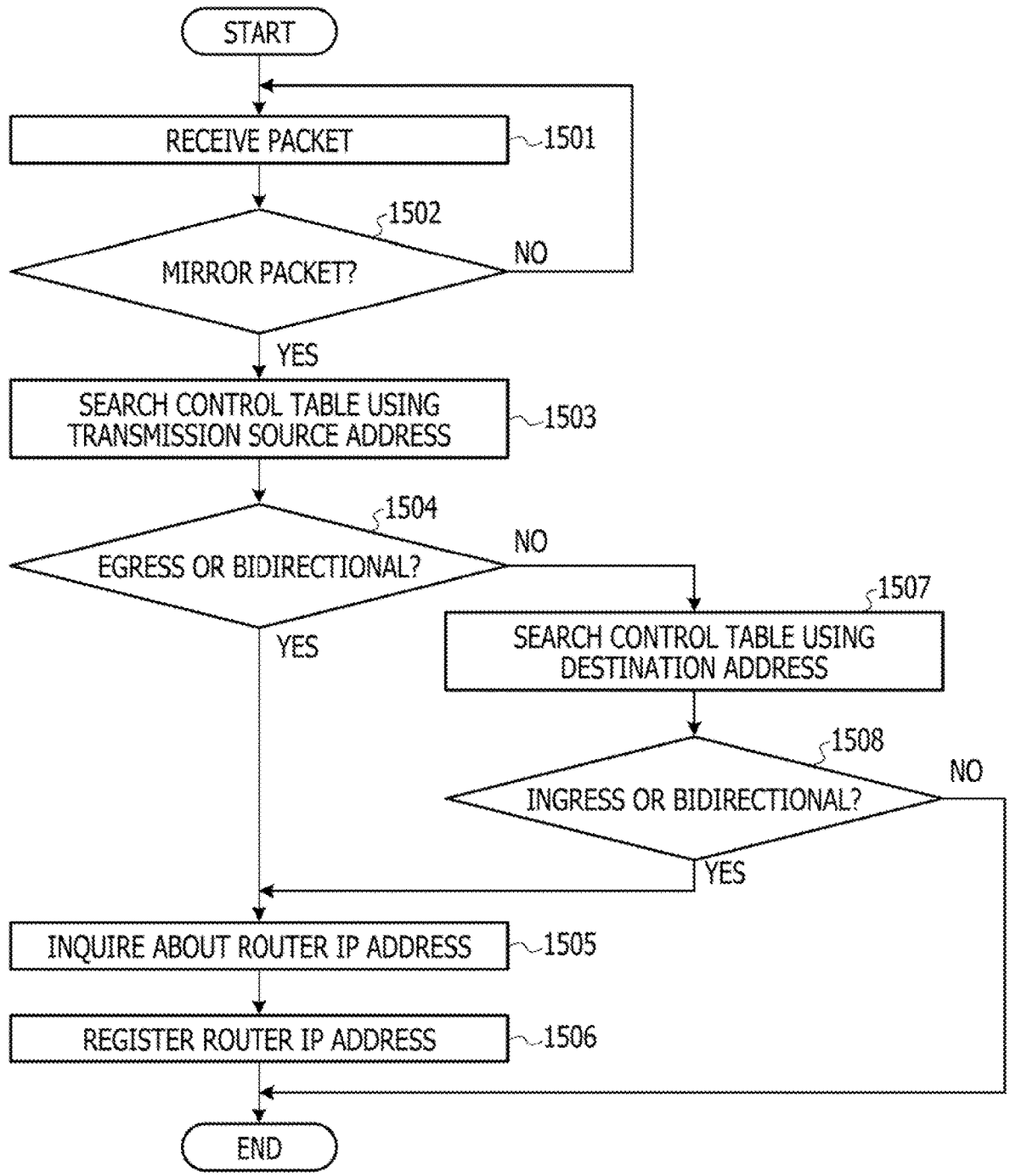
FIG. 15 is a flowchart of registration processing.

FIG. 15 is a flowchart illustrating an example of registration processing performed by the virtual switch 1012 operating in the information processing device 902. The control unit 921 causes the virtual switch 1012 to perform the registration processing in FIG. 15, so that the router IP address corresponding to the destination address of the mirror packet is stored in the control table 927.

First, the virtual switch 1012 receives a packet (step 1501) and checks whether the received packet is the mirror packet (step 1502). In the case where the received packet is not the mirror packet (step 1502, NO), the virtual switch 1012 repeats the processing from step 1501 onward.

In the case where received packet is the mirror packet (step 1502, YES), the virtual switch 1012 searches the control table 927 using the transmission source address of the mirror packet (step 1502). Then, the virtual switch 1012 checks the direction of the entry including the target container IP address that matches the transmission source address of the mirror packet (step 1504).

In the case where the direction of the entry is egress or bidirectional (step 1504, YES), the virtual switch 1012 inquires of the BGP daemon the router IP address corresponding to the destination address of the mirror packet (step 1505). Then, the virtual switch 1012 acquires the router IP address from the BGP daemon.

Next, the virtual switch 1012 registers the acquired router IP address in the entry searched from the control table 927 (step 1506). Thereby, the router IP address and the mirror destination MAC address are associated with each other in the control table 927.

In the case where the direction of the entry is ingress (step 1504, NO), the virtual switch 1012 searches the control table 927 using the destination address of the mirror packet (step 1507). Then, the virtual switch 1012 checks the direction of the entry including the target container IP address that matches the destination address of the mirror packet (step 1508).

In the case where the direction of the entry is ingress or bidirectional (step 1508, YES), the virtual switch 1012 performs the processing from step 1505 onwards. In the case where the direction of the entry is egress (step 1508, NO), the virtual switch 1012 terminates the processing.

Figure 16:
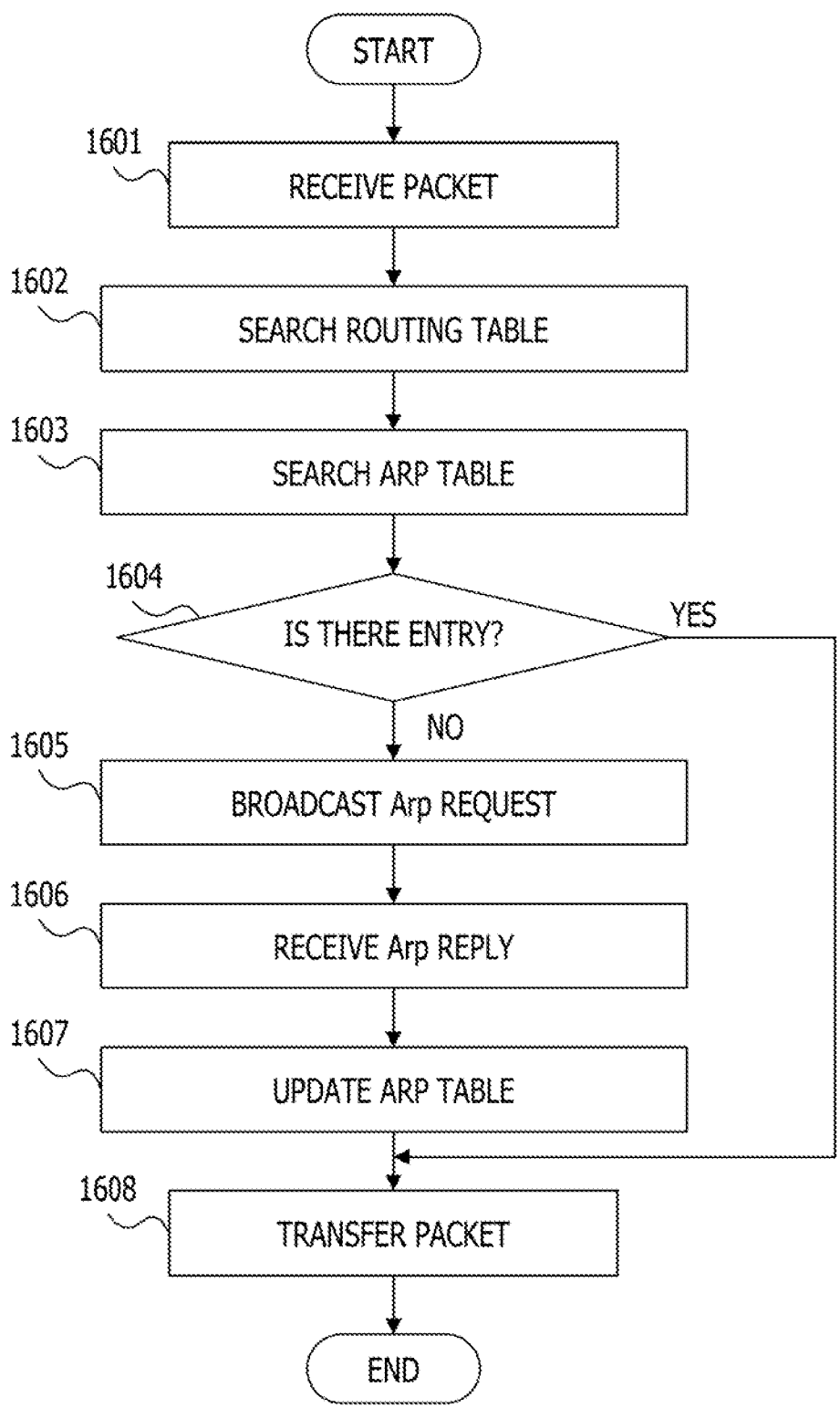
FIG. 16 is a flowchart of packet transfer processing.

FIG. 16 is a flowchart illustrating an example of packet transfer processing performed by the VM 1002 operating in the information processing device 902. When the control unit 922 causes the VM 1002 to perform the packet transfer processing in FIG. 16, the mirror packet received by the VM 1002 is transferred to the container 1023.

First, the eth0 of the VM 1002 receives a packet from the virtual switch 1012 (step 1601), and the VM 1002 searches the routing table 92 using the destination address of the received packet (step 1602).

In a case where an entry corresponding to the destination address is present in the routing table 925, the VM 1002 searches the ARP table 926 (step 1603). Then, the VM 1002 checks whether an entry including the MAC address corresponding to the destination address or the MAC address of the default gateway is present in ARP table 926 (step 1604).

In the case where the entry is present in the ARP table 926 (step 1604, YES), the VM 1002 inserts the MAC address included in the entry into the destination MAC field of the received packet and transfers the packet (step 1608).

On the other hand, in the case where the entry is not present in the ARP table 926 (step 1604, NO), the VM 1002 searches the routing table 925 to acquire the router IP address corresponding to the destination address of the received packet. Then, the VM 1002 broadcasts the Arp request for the acquired router IP address (step 1605).

Next, the VM 1002 receives the Arp reply (step 1606) and updates the ARP table 926 using the MAC address included in the Arp reply (step 1607). Then, the VM 1002 inserts the MAC address included in the Arp reply into the destination MAC field of the received packet and transfers the packet (step 1608).

For example, in the case where the received packet is the mirror packet, the router IP address corresponding to the destination address of the mirror packet is acquired, and the Arp request corresponding to the router IP address is broadcasted in step 1605. In this case, in step 1607, the destination address of the mirror packet and the mirror destination MAC address included in the Arp reply are stored in association with each other in the ARP table 926. Then, in step 1608, the mirror destination MAC address is inserted into the destination MAC field of the mirror packet and transferred to the container 1023.

Figure 17:
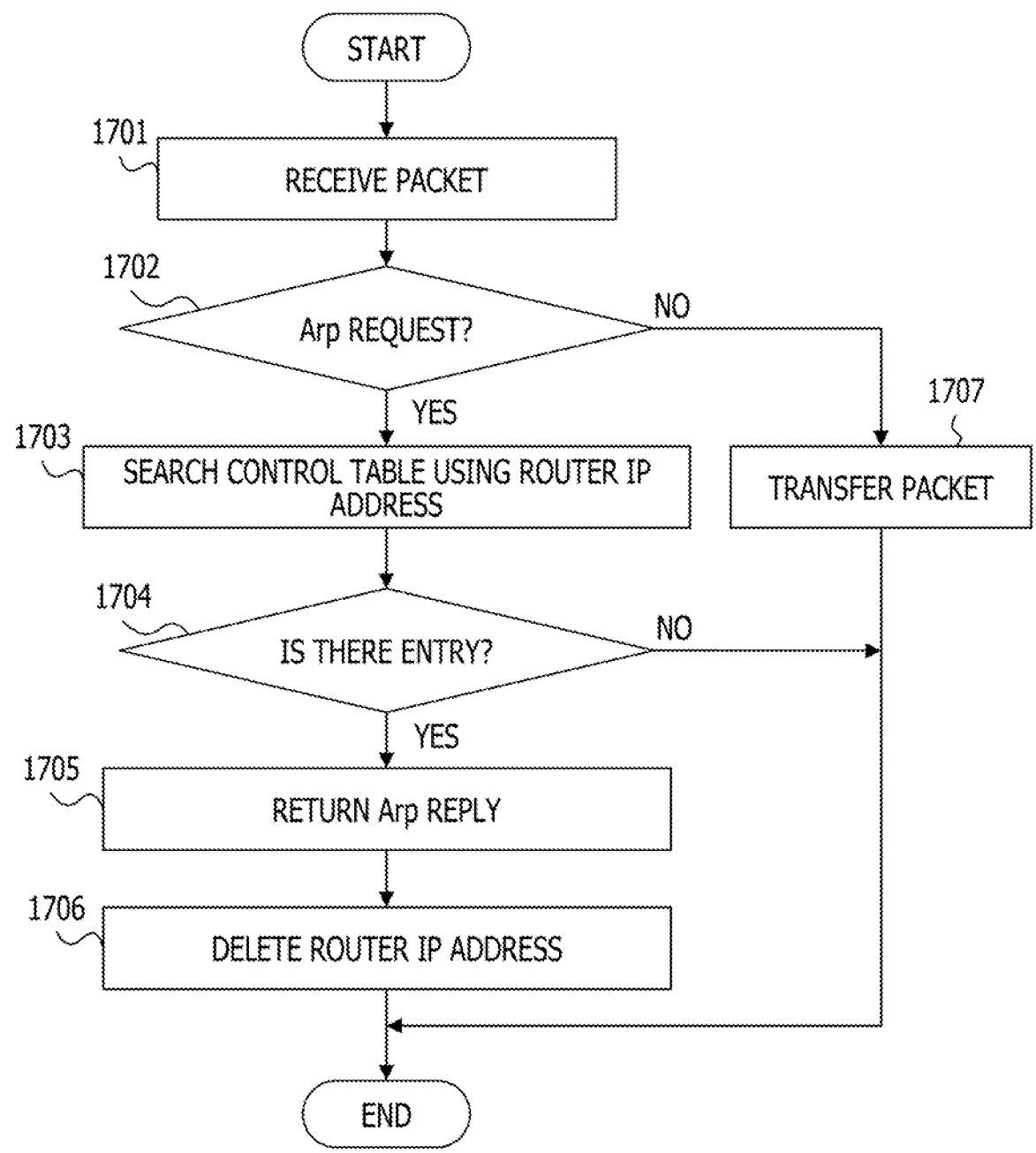
FIG. 17 is a flowchart of response processing.

FIG. 17 is a flowchart illustrating an example of response processing performed by the virtual switch 1012 operating in the information processing device 902. The control unit 922 causes the virtual switch 1012 to perform the response processing in FIG. 17, so that the Arp reply is returned to the Arp request broadcasted from the VM 1002.

First, the virtual switch 1012 receives a packet from the VM 1002 (step 1701) and checks whether the received packet is the Arp request (step 1702). In the case where the received packet is not the Arp request (step 1702, NO), the virtual switch 1012 transfers the packet (step 1707).

On the other hand, in the case where the received packet is the Arp request (step 1702, YES), the virtual switch 1012 searches the control table 927 using the router IP address included in the Arp request (step 1703). Then, the virtual switch 1012 checks whether an entry including the router IP address is present in the control table 927 (step 1704). In the case where the entry is not present in the control table 927 (step 1704, NO), the virtual switch 1012 terminates the processing.

On the other hand, in the case where the entry is present in the control table 927 (step 1704, YES), the virtual switch 1012 acquires the mirror destination MAC address included in the entry. Then, the virtual switch 1012 returns the Arp reply including the acquired mirror destination MAC address to the VM 1002 (step 1705).

Next, the virtual switch 1012 deletes the router IP address of the entry searched from the control table 927 and stores the initial value "None" instead (step 1706). Thereby, the entry is changed to the initial state.

The configuration of the network management system 701 in FIG. 7 is merely an example and some constituent elements may be omitted or modified depending on the use or conditions of the network management system 701. The configuration of the information processing system in FIG. 9 is merely an example and some constituent elements may be omitted or modified depending on the use or conditions of the information processing system. The configuration of the VM system in FIG. 10 is merely an example and some constituent elements may be omitted or modified depending on the use or conditions of the VM system.

The flowcharts illustrated in FIGS. 8 and 15 to 17 are merely examples, and some processes may be omitted or changed depending on the configuration or conditions of the network management system 701 or the information processing system.

The VMs, containers, virtual switches, virtual ports, virtual NICs, virtual routers, and virtual taps illustrated in FIGS. 1 to 5 and 10 are merely examples, and the configuration of the VM system changes depending on the use of the VM system.

The PBR illustrated in FIGS. 6A and 6B and the routing table illustrated in FIG. 11 are mere examples, and the PBR and the routing table change according to the configuration of the VM system. The management table illustrated in FIG. 12 and the control table illustrated in FIG. 13 and FIGS. 14A and 14B are mere examples, and the management table and the control table change according to the information input by the administrator.

Figure 18:
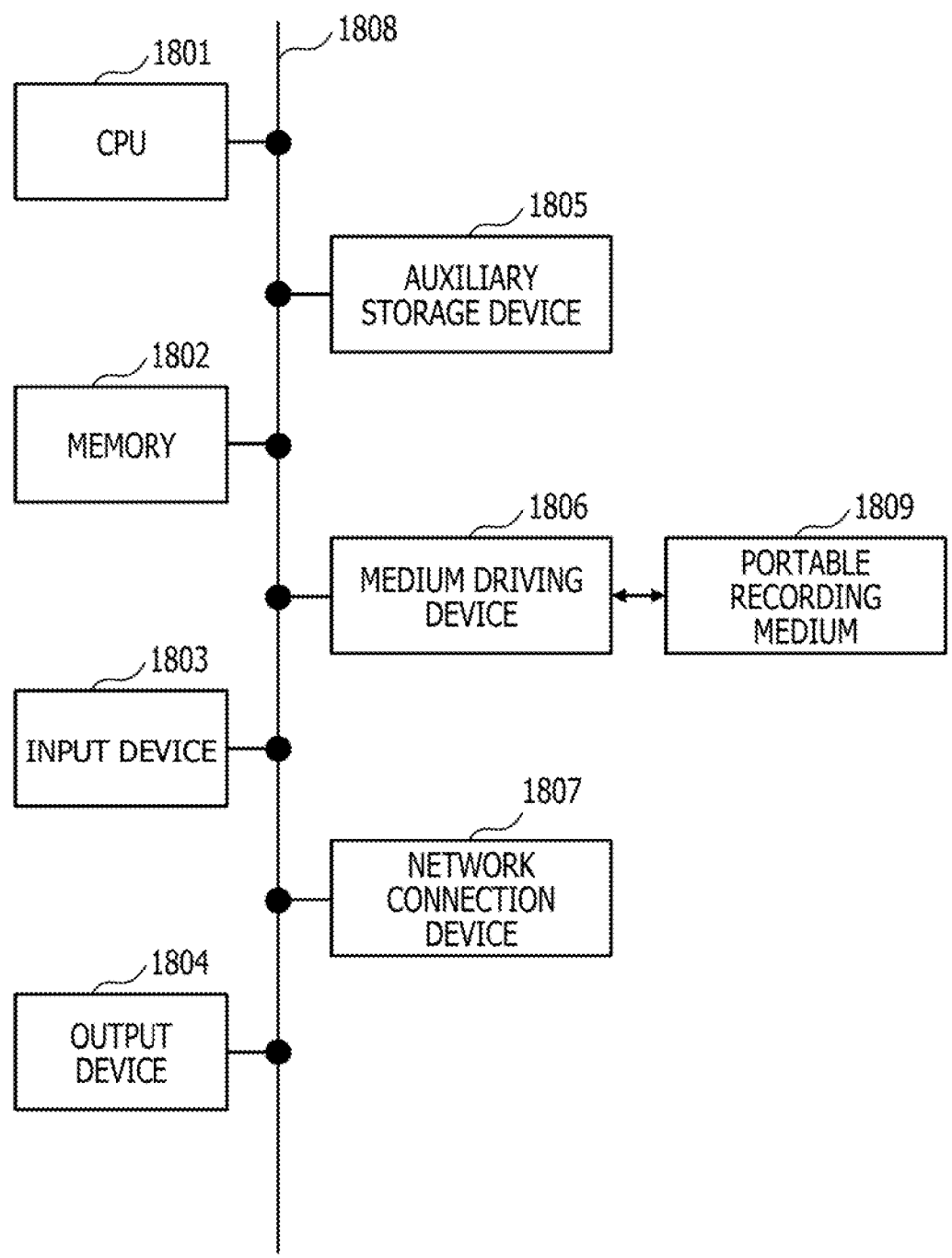
FIG. 18 is a hardware configuration diagram of the information processing device.

FIG. 18 illustrates a hardware configuration example of the information processing device 901 to the information processing device 903 in FIG. 9. The information processing device is sometimes called a computer. The information processing device in FIG. 18 includes a central processing unit (CPU) 1801, a memory 1802, an input device 1803, an output device 1804, an auxiliary storage device 1805, a medium driving device 1806, and a network connection device 1807. These constituent elements are hardware and are connected to each other by a bus 1808.

The memory 1802 is, for example, a semiconductor memory such as a read only memory (ROM), a random access memory (RAM), or a flash memory, and stores programs and data to be used for the processing. The memory 1802 can be used as the storage unit 913, the storage unit 924, or the storage unit 933 in FIG. 9.

The CPU 1801 (processor) operates as the control unit 911 in FIG. 9, for example, by executing a program using the memory 1802. The CPU 1801 operates as the control unit 921 and the control unit 922 by executing a program using the memory 1802. The CPU 1801 operates as the management unit 931 by executing a program using the memory 1802.

The input device 1803 is, for example, a keyboard, a pointing device, or the like and is used for inputting instructions and information from a user or an operator. The output device 1804 is, for example, a display device, a printer, a speaker, or the like and is used for making an inquiry to the user or the operator and outputting a processing result. The processing result may be a result of the mirror packet analysis processing performed by the container 1023 in FIG. 10.

The auxiliary storage device 1805 is, for example, a magnetic disk device, an optical disk device, a magneto-optical disk device, a tape device, or the like. The auxiliary storage device 1805 may be a hard disk drive or a flash memory. The information processing device can store programs and data in the auxiliary storage device 1805 and load these programs and data into the memory 1802 for use.

The medium driving device 1806 drives a portable recording medium 1809 and accesses recorded content of the portable recording medium 1809. The portable recording medium 1809 is a memory device, a flexible disk, an optical disk, a magneto-optical disk, or the like. The portable recording medium 1809 may be a compact disk read only memory (CD-ROM), a digital versatile disk (DVD), or a universal serial bus (USB) memory. The user or the operator can store the programs and data in this portable recording medium 1809 and can use these programs and data by loading them into the memory 1802.

As described above, a computer-readable recording medium storing the programs and data to be used for the processing is a physical (non-transitory) recording medium such as the memory 1802, the auxiliary storage device 1805, or the portable recording medium 1809.

The network connection device 1807 is a communication interface circuit connected to the communication network 904 and which performs data conversion associated with communication. The network connection device 1807 can be used as the communication unit 912, the communication unit 923, or the communication unit 932 in FIG. 9. The information processing device can receive the programs and data from an external device via the network connection device 1807 and use these programs and data by loading them into the memory 1802.

Note that, the information processing device does not need to include all the constituent elements in FIG. 18, and some constituent elements may be omitted depending on the use or the condition. For example, in a case where the information processing device in FIG. 18 is the information processing device 901 or the information processing device 902, and the interface for the user or the operator is unnecessary, the input device 1803 and the output device 1804 may be omitted. Furthermore, in a case of not using the portable recording medium 1809, the medium driving device 1806 may be omitted.

While the disclosed embodiments and the advantages thereof have been described in detail, those skilled in the art will be able to make various modifications, additions, and omissions without departing from the scope of the present embodiments as explicitly set forth in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A network management apparatus comprising:
 a first controller configured to operate a first virtual machine and a virtual switch, the first virtual machine including a first container monitoring a mirror packet, the virtual switch transferring the mirror packet;
 a memory configured to store a destination information of the mirror packet and an address corresponding to the first container in association with each other, and a second controller configured to cause the virtual switch to perform a first operation and cause the virtual machine to perform a second operation when the virtual machine receives the mirror packet from the virtual switch and requests address resolution for the destination information of the mirror packet, the first operation is an operation to transmit the address corresponding to the first container from the virtual switch to the first virtual machine, and the second operation is an operation to transfer the mirror packet to the first container from the first virtual machine, using the address that is received from the virtual switch by the first operation.

2. The network management apparatus according to claim 1, wherein the destination information of the mirror packet is an address of a second virtual machine including a second container corresponding to a destination address of the mirror packet, and the second controller acquires the address of the second virtual machine based on the destination address of the mirror packet, and causes the first virtual machine to perform an operation to request address resolution for the address of the second virtual machine.

3. The network management apparatus according to claim 2, wherein when the virtual switch receives the mirror packet, the first controller causes the virtual switch to acquire an address corresponding to the second virtual machine based on the destination address of the mirror packet and to store the address of the second virtual machine and the address corresponding to the first container in association with each other in the memory.

4. The network management apparatus according to claim 2, wherein
the memory stores an address resolution table, and
the second controller causes the first virtual machine to perform an operation to store the destination address of the mirror packet in association with the address corresponding to the first container in an address resolution table.

5. The network management apparatus according to claim 2, wherein the destination address of the mirror packet is an internet protocol address of the second container, the address of the second virtual machine is an internet protocol address of the second virtual machine, and the address corresponding to the first container is a media access control address of an interface corresponding to a route to the first container.

6. A network management system comprising:
a first controller configured to operate a first virtual machine including a first container and a first virtual switch that transmits a mirror packet of a reception packet received by the first container or a transmission packet transmitted by the first container;
a second controller configured to operate a second virtual machine including a second container that monitors the mirror packet, and a second virtual switch that receives the mirror packet from the first virtual switch and transfers the mirror packet to the second virtual machine; and
a third controller configured to cause the second virtual switch to perform a first operation and cause second virtual machine to perform a second operation when the second virtual machine receives the mirror packet from the second virtual switch and requests address resolution for the destination information of the mirror packet,
the first operation is an operation to transmit an address corresponding to the second container from the second virtual switch to the first virtual machine, the address corresponding to the second container is associated with destination information of the mirror packet, and
the second operation is an operation to transfer the mirror packet to the second container from the second virtual machine, using the address that is received from the virtual switch by the first operation.

7. The network management system according to claim 6, wherein the destination information of the mirror packet is an address of another virtual machine including another container corresponding to a destination address of the mirror packet, and the third controller acquires the address of the another virtual machine based on the destination address of the mirror packet, and causes the second virtual machine to perform an operation to request address resolution for the address of the another virtual machine.

8. The network management system according to claim 7, wherein when the mirror packet is of the reception packet, the another container is the first container, and the another virtual machine is the first virtual machine.

9. The network management system according to claim 8, wherein when the second virtual switch receives the mirror packet from the first virtual switch, the second controller acquires the address of the third virtual machine based on the destination address of the mirror packet, and causes the second virtual switch to perform an operation to store the address of the third virtual machine in association with the address corresponding to the second container.

10. The network management system according to claim 8, wherein the third controller causes the second virtual machine to perform an operation to store the destination address of the mirror packet in association with the address corresponding to the second container in an address resolution table.

11. The network management system according to claim 8, wherein the destination address of the mirror packet is an internet protocol address of the third container, the address of the third virtual machine is an internet protocol address of the third virtual machine, and the address corresponding to the second container is a media access control address of an interface corresponding to a route to the second container.

12. A non-transitory computer-readable storage medium storing a program that causes a processor included in a network management apparatus to execute a process, the process comprising:
operating a first virtual machine and a virtual switch, the first virtual machine including a first container monitoring a mirror packet, the virtual switch transferring the mirror packet;
causing the virtual switch to perform an operation to transmit an address corresponding to the first container when the virtual machine receives the mirror packet from the virtual switch and requests address resolution for the destination information of the mirror packet, the address corresponding to the first container is associated with destination information of the mirror packet; and
causing the virtual machine to perform an operation to transfer the mirror packet to the first container, using the address that is received from the virtual switch by the first operation.

13. The non-transitory computer-readable storage medium according to claim 12,
wherein the destination information of the mirror packet is an address of a second virtual machine including a second container corresponding to a destination address of the mirror packet, and the process is further comprising:

causing the first virtual machine to acquire the address of the second virtual machine based on the destination address of the mirror packet, and causing the first virtual machine to perform an operation to request address resolution for the address of the second virtual machine.

14. The non-transitory computer-readable storage medium according to claim 13, the process further comprising:

when the virtual switch receives the mirror packet, causing the virtual switch to acquire an address corresponding to the second virtual machine based on the destination address of the mirror packet and to store the address of the second virtual machine and the address corresponding to the first container in association with each other.

15. The non-transitory computer-readable storage medium according to claim 13, the process further comprising:

causing the first virtual machine to perform an operation to store the destination address of the mirror packet in association with the address corresponding to the first container in an address resolution table.

16. The network management apparatus according to claim 13, wherein the destination address of the mirror packet is an internet protocol address of the second container, the address of the second virtual machine is an internet protocol address of the second virtual machine, and the address corresponding to the first container is a media access control address of an interface corresponding to a route to the first container.

\* \* \* \* \*